United States Patent [19] | [11] 4,263,932
Laar et al. | [45] Apr. 28, 1981

[54] ACCURATE DOSING OF REGENERATING FLUID TO PROCESSING-FLUID-TANK IN FILM DEVELOPING MACHINE

[75] Inventors: Erwin Laar, Taufkirchen; Werner Sieber; Josef Spickenreither, both of Munich, all of Fed. Rep. of Germany

[73] Assignee: AGFA-Gevaert, A.G., Leverkusen, Fed. Rep. of Germany

[21] Appl. No.: 937,945

[22] Filed: Aug. 30, 1978

[30] Foreign Application Priority Data

Aug. 31, 1977 [DE] Fed. Rep. of Germany ....... 2739293

[51] Int. Cl.[3] ........................ F16K 33/00; G05D 9/02

[52] U.S. Cl. ................................ 137/101.27; 73/198; 128/214 C; 137/433; 137/572; 222/64; 354/324

[58] Field of Search .............. 73/198, 209; 128/214 C; 222/64; 354/324; 137/386, 390, 399, 429, 430, 433, 572

[56] References Cited

U.S. PATENT DOCUMENTS

| | | | |
|---|---|---|---|
| 573,005 | 12/1896 | Kordick | 137/430 |
| 628,581 | 7/1899 | Grosswyler | 137/433 |
| 991,530 | 5/1911 | Norman | 137/433 |
| 1,227,539 | 5/1917 | Illsley | 137/433 |
| 1,432,574 | 10/1922 | Sheer | 137/433 |
| 1,469,963 | 10/1923 | Sartakoff | 137/433 |
| 1,945,429 | 1/1934 | Fowler | 137/433 |
| 2,695,626 | 11/1954 | Riche | 137/433 |
| 3,100,496 | 8/1963 | Reiser | 73/209 UX |
| 3,189,063 | 6/1965 | Lowe | 137/433 |
| 3,342,068 | 9/1967 | Metzger | 73/209 |
| 3,522,013 | 7/1970 | Borgeson | 137/430 |
| 3,667,464 | 6/1972 | Alligood, Jr. | 128/214 C |
| 3,718,155 | 2/1973 | Suzuki et al. | 137/433 |
| 3,756,233 | 9/1973 | Goldowsky | 128/214 C |
| 3,841,351 | 10/1974 | Shida | 354/324 |
| 3,963,024 | 6/1976 | Goldowsky | 128/214 C |
| 4,096,879 | 6/1978 | Scrur et al. | 137/433 |

*Primary Examiner*—Martin P. Schwadron
*Assistant Examiner*—G. L. Walton
*Attorney, Agent, or Firm*—Michael J. Striker

[57] ABSTRACT

The film developing machine includes a tank containing developing fluid, to which a dosing device continually adds regenerating fluid received from a regenerating-fluid supply tank. To prevent the gradual emptying of the supply tank from producing an accuracy-reducing gradual decrease in the pressure applied to the input side of the dosing device, the latter is connected to the supply tank via a buffer vessel provided with an internal valve mechanism serving automatically to keep the volume of regenerating fluid in the buffer vessel substantially constant despite variations in the amount of regenerating fluid contained in the supply tank.

8 Claims, 2 Drawing Figures

ACCURATE DOSING OF REGENERATING FLUID TO PROCESSING-FLUID-TANK IN FILM DEVELOPING MACHINE

BACKGROUND OF THE INVENTION

The present invention concerns continuous-transport developing machines for photographic emulsion carriers of the type including at least one tank filled with processing fluid, to which regenerating fluid must be continually added to maintain the chemical activity of the processing fluid. The replenishing means used to supply the regenerating fluid typically comprises a dosing valve provided with a flow meter and a supply tank containing regenerating fluid and supplying such fluid to the dosing valve.

With continuous-transport developing machines of the type in question, because of the high rate at which photographic emulsion carrier is transported through the machine, the rate at which regenerating fluid must be added to the processing-fluid tanks is quite high. For this reason, the regenerating fluid is typically kept in relatively large supply tanks and from there directly fed to the processing-fluid tanks to be replenished. For reasons of limited space availability, it is often necessary that these large supply tanks be located relatively distant from the processing-fluid tanks which they are to replenish, the regenerating fluid then being fed to the dosingvalves for the processing-fluid tanks by reliance on gravity descent or utilizing pumps. In either case, the pressure just upstream of the dosing valve fluctuates very considerably in dependence upon the extent to which the supply tank is filled with regenerating fluid at any particular time. As a result, in order to achieve high-precision dosing of regenerating fluid, it becomes necessary to provide the dosing valve with negative-feedback volumetric flow rate control means, or else to frequently readjust the dosing valve as the supply tank continually empties.

SUMMARY OF THE INVENTION

It is the general object of the invention to provide a continuous-transport developing machine of the type described above, but with the replenishing means so designed that continual automatic or manual readjustment of the dosing valve is no longer necessary.

In accordance with the invention, this is achieved by feeding regenerating fluid from the supply tank to the dosing valve, through the intermediate of a buffer vessel which isolates the dosing valve from the effect of changes in the height of regenerating fluid in the continually emptied supply tank. The buffer vessel accepts regenerating fluid from the supply tank, but in an automatically regulated manner such that the amount of regenerating fluid in the buffer vessel is maintained substantially constant. Accordingly, the hydrostatic pressure of fluid in the buffer vessel is maintained substantially constant. The buffer vessel is provided with means sensing the amount of fluid therein, and controlling the admittance of regenerating fluid into the buffer vessel in a sense automatically maintaining such amount substantially constant.

With the inventive technique, even if the hydrostatic pressure upstream of the buffer vessel varies from a rated value of ±20%, the amount of regenerating fluid contained in the buffer vessel can be kept constant to within about ±1%.

Accordingly, the pressure applied to the input side of the dosing valve is maintained substantially constant, greatly increasing the exactness of the dosing operation performed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
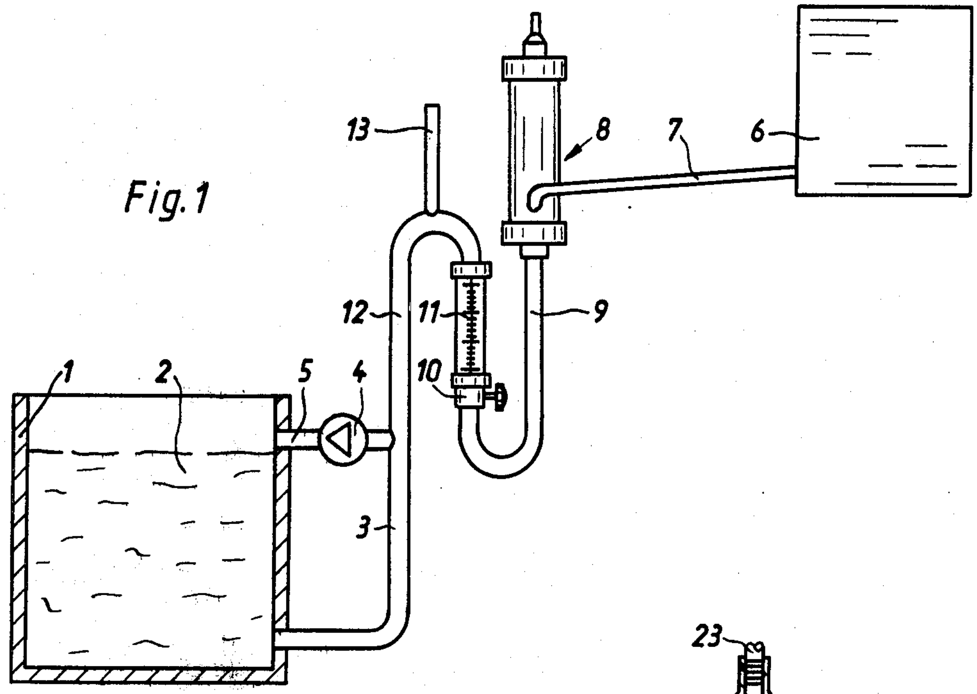
FIG. 1 is a schematic representation of how, in accordance with the present invention, a processing-fluid tank of a photographic film developing machine is to be replenished with regenerating fluid.

In FIG. 1, numeral 1 denotes a tank filled with film processing fluid 2. A fluid withdrawal conduit 3 extends from the bottom of tank 1 up to a pump 4 which latter discharges into a return conduit 5. A supply tank 6 filled with regenerating fluid is located remote from the processing-fluid tank 1. A feed conduit 7 extends out from the bottom of supply tank 6 and feeds regenerating fluid to the inlet port of a self-regulating buffer vessel 8, described in greater detail below with respect to FIG. 2. From the outlet port of buffer vessel 8 a conduit 9 feeds to the inlet side of a dosing valve 10 provided with a volumetric flow rate meter 11 for monitoring and adjustment of the operation of the dosing valve 10. The outlet side of the flow meter 11 is connected via a conduit 12 to the input side of the pump 4. The bent conduit 12 at its highest point is provided with a venting pipe 13.

In the illustrated embodiment, the supply tank 6 is located elevated relative to the self-regulating buffer vessel 8. Self-evidently, however, the supply tank 6 could be located lower than vessel 8, in which case feed conduit 7 would be provided with a pump for pumping regenerating fluid from the supply tank 6 to the buffer vessel 8.

Figure 2:
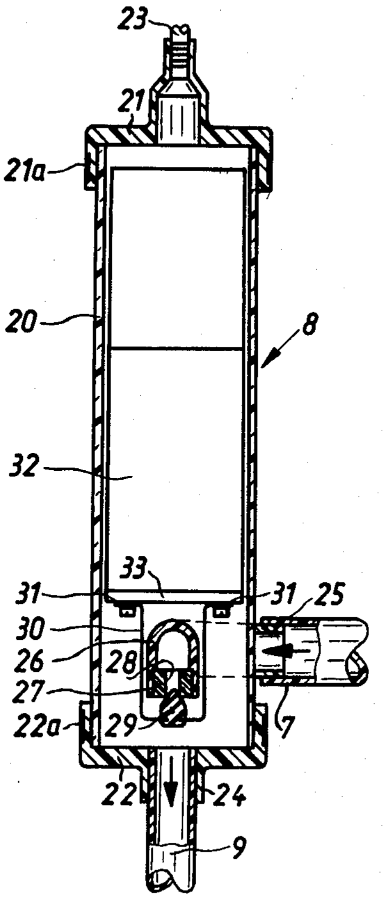
FIG. 2 is a cross-section through the buffer vessel shown in FIG. 1.

The self-regulating buffer vessel 8 is depicted in detail in FIG. 2. It comprises a cylindrical pipe 20 closed off at the top by a cover 21 and at the bottom by a bottom part 22. Parts 21 and 22 are provided with recesses *12a*, *22a* which securely accommodate the ends of the cylindrical pipe 20. Cover 21 is provided at its upper side with a small pipe section 23 for venting purposes. The bottom part 22 is provided with the outlet port 24 of the vessel 8, to which the conduit 9 is connected on.

At the lower region of the cylindrical pipe 20, at the side thereof, there is provided the inlet port 25 of the buffer vessel 8. The pipe connector constituting the inlet port 25 extends, from exterior of the cylindrical pipe 20, horizontally inwards into the interior of the pipe 20, as indicated by the broken lines, terminating approximately in the middle of the interior of the pipe 20 in an end part 26 which is downwardly open and of generally inverted-U cross-section. A valve seat member 27 is inserted into the end part 26 of the inlet port 25 and is provided with a cylindrical bore 28 constituting a valve opening, the latter being blocked and unblocked by a conical rubber valve member 29. The rubber conical valve member 29 is secured to the bottom of a generally U-shaped holding bracket 30, which may be made for example of bent rod or wire stock. The two vertically extending legs of the U-shaped holding bracket 30 each extend upwards laterally of the end part 26 of the inlet port 25. Each leg of the U-shaped bracket 30 is at its top bent over and secured by a respective screw 31 to the underside of a carrier plate 33, which latter in turn is secured to the underside of a float member 32. When the float member 32 ascends, the U-shaped holding bracket 30 and therefore the valve member 29 are pulled upwards, closing the valve 27, 28, 29. When the float member 32 descends, the U-shaped holding bracket 30 and the valve member 29 likewise descend, thereby opening the valve 27, 28, 29. The valve member 29 can assume settings intermediate fully blocking and fully unblocking, as described further below. The float member 32 is cylindrical and occupies approximately 90% of the internal volume of the cylindrical pipe 20 above the carrier plate 33. I.e., the annular clearance between the outer periphery of float member 32 and the inner periphery of pipe 20 is very small, and for the whole range of movement of float member 32, and especially when the valve member 29 is in the fully blocking position, the clearance between the upper face of float member 32 and the cover 21 is likewise small. Float member 32 is made of a high-buoyancy material, preferably PVC hardened foam material. However, other high-buoyancy materials may be used, provided that they can resist the chemical agressiveness of whichever processing fluid is involved.

The operation of the system depicted in FIGS. 1 and 2 is as follows:

The buffer vessel 8 is self-regulating and automatically maintains the volume of regenerating fluid therein approximately constant. The pressure of regenerating fluid in feed line 7 is transmitted to the interior of the end part 26 of the inlet port 25 of the buffer vessel 8, and exerts a downwards force upon the valve member 29, attempting to move the valve member 29 downwards towards fully unblocking position. With the valve 27, 28, 29 thusly in an unblocking setting, regenerating fluid can enter the interior of buffer vessel 8 through this internal valve. As the volume of regenerating fluid in the interior of buffer vessel 8 increases, the float member 32 rises due to buoyant action, lifting the valve member 29 towards closed position, so that further regeneratng fluid cannot enter the buffer vessel 8. When regenerating fluid is withdrawn from buffer vessel 8 through dosing valve 10, the amount of regenerating fluid in vessel 8 decreases somewhat, and the valve 27, 28 29 internal to the vessel opens somewhat, so that more regenerating fluid can enter. If the dosing valve 10 is set to a desired volumetric flow rate and the dosing action is continuous, i.e., non-intermittent, then the valve 27, 28, 29 will assume an intermediate steady-state setting such as to keep the amount of regenerating fluid in the interior of buffer vessel 8 constant. If the pressure in feed line 7 suddenly drops, or gradually decreases during the gradual emptying of the supply tank 6, the pressure in the interior of the end part 26 of the inlet port 25 of buffer vessel exerts less downwards force on the valve member 29, creating a tendency for the valve member 29 to move towards blocking position. However a decrease in the unblocked cross-section of the valve 27, 28, 29 leads to a decrease in the volume of regenerating fluid in the interior of the buffer vessel 8, in turn leading to descent of the float member 32, this thereby counteracting the tendency of the buffer vessel 8 to empty out. The converse happens if the pressure in feed line 7 increases, e.g., when regenerating fluid is periodically added to that contained in the supply tank 6. In this way, the dosing valve 10 is kept isolated from the pressure changes, both gradual and more abrupt, occurring within the feed line 7.

The illustrated, preferred embodiment offers a further significant advantage, in that the valve mechanism internal to the buffer vessel 8 is at all time located beneath the upper surface of the regenerating fluid contained in the interior of the buffer vessel. This prevents regenerating fluid from crystallizing out on the valve seat, prevents regenerating fluid from foaming and, in the event the regenerating fluid is developer regenerate, prevents the regenerating fluid from experiencing oxidative degeneration. In particular, because the space surrounding the float member 32 and above it within the interior of buffer vessel 8 is very small in volume, and because the interior of vessel 8 below float member 32 is perpetually filled with regenerating fluid, the extent to which such regenerating fluid is contacted by air in passing though the buffer vessel is likewise kept minimal. By preventing crystallization of regenerating fluid on the valve seat member 27, it is assured that the conical rubber valve member 29 will always seat properly. The latter advantageously has a cone angle of between 50° and 70°, preferably 60°.

Because the pressure in conduit 9 is maintained constant, once the dosing valve 10 has been adjusted to a selected volumetric flow rate, e.g., adjusted using the illustrated adjusting knob and the result of the adjustment monitored on the flow meter 11, the selected flow rate is thereafter maintained quite exactly, making for the desired high degree of accuracy in the continual replenishment of the processing fluid in tank 1.

It will be understood that each of the elements described above, or two or more together, may also find a useful application in other types of constructions differing from the types described above.

While the invention has been illustrated and described as embodied in the context of a particular type of film developing machine provided with a particular type of dosing means it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a continuous-transport developing machine for photographic emulsion carriers, in combination, a processing-fluid tank containing processing fluid; a supply tank containing a supply of regenerating fluid which is to be fed into the processing-fluid tank to maintain the chemical activity of the processing fluid therein and which fluctuates with a corresponding variation in the fluid pressure exerted by the fluid in the supply tank; fluid-feeding means having an inflow port for receipt of regenerating fluid and an outlet port connected to supply regenerating fluid to the tank and being operative for controlling the rate at which regenerating fluid is fed to the processing-fluid tank; a buffer vessel connected exteriorly of and intermediate the supply tank and the fluid-feeding means and operative for isolating the fluid-feeding means from the pressure variations attributable to variations in the amount of regenerating fluid in the supply tank, said buffer vessel having an inlet pipe connected to receive regenerating fluid from the supply tank and an outlet port transmitting regenerating fluid to the fluid-feeding means; and valve means located in the interior of the buffer vessel and operative for automatically controlling the passage of fluid from the inlet pipe to the outlet port of the buffer vessel in dependence upon the amount of fluid contained in the buffer vessel, said valve means including a valve body member, a valve seat member and a buoyant float element coupled to one of said members for automatically adjusting the relative positions of the valve body member and valve seat member in dependence upon the amount of regenerating fluid in the interior of said buffer vessel to maintain a substantially constant amount of regenerating fluid in the interior of the buffer vessel, the inlet pipe of the buffer vessel extends into the interior of said vessel and forming the valve seat member and said valve body member being located so as to be beneath the upper surface of the regenerating fluid in the interior of the buffer vessel to prevent regenerating fluid from crystallizing out on the valve seat member and the valve body member.

2. The developing machine defined in claim 1, the fluid-feeding means comprising an adjustable volumetric flow rate dosing valve and a cooperating volumetric flow rate meter facilitating adjustment of the dosing valve.

3. The developing machine defined in claim 1, the valve seat member and valve body member being located beneath the buoyant float element, the float element being coupled to and moving the valve body member.

4. The developing machine defined in claim 3, the valve body member being a conical element whose apex projects towards the valve seat member, the valve body member being made of elastic material and having a cone angle between about 50° and 70°.

5. The developing machine defined in claim 3, the float element being made of high-buoyancy material.

6. The developing machine defined in claim 5, the float element being made of PVC hardened foam material.

7. The developing machine defined in claim 5, the float element occupying at least 80–90% of the part of the interior volume of the buffer vessel which is located higher than the valve means.

8. The developing machine defined in claim 1, the inlet pipe of the buffer vessel extending inwardly from the exterior of the buffer vessel into the interior thereof and terminating in a downwardly open end part located approximately in the middle of the interior of the buffer vessel, the end part being provided with the valve seat member, the valve body member being located beneath the downwardly open end part, the valve means furthermore including a holding bracket holding the valve body member in position opposite the valve seat member, extending upwards to either side of the end part and being secured to the underside of the float element.

* * * * *